(12) United States Patent
Volk et al.

(10) Patent No.: US 10,189,211 B2
(45) Date of Patent: Jan. 29, 2019

(54) METHOD FOR PROCESSING ADDITIVELY MANUFACTURED PART BY ROBOTICALLY MOVING MEDIUM INSIDE PART CAVITY

(71) Applicant: Icodema3D, LLC, Ithaca, NY (US)

(72) Inventors: Scott Volk, Ithaca, NY (US); Michael D. Pinnisi, Ithaca, NY (US)

(73) Assignee: Incodema3D, LLC, Freeville, NY (US)

( * ) Notice: Subject to any disclaimer, the term of this patent is extended or adjusted under 35 U.S.C. 154(b) by 295 days.

(21) Appl. No.: 14/947,751

(22) Filed: Nov. 20, 2015

(65) Prior Publication Data

US 2016/0200050 A1 Jul. 14, 2016

Related U.S. Application Data

(60) Provisional application No. 62/101,611, filed on Jan. 9, 2015.

(51) Int. Cl.
*G06F 19/00* (2018.01)
*B29C 67/00* (2017.01)
(Continued)

(52) U.S. Cl.
CPC ........ *B29C 67/0088* (2013.01); *B24B 31/112* (2013.01); *B25J 9/12* (2013.01); *B29C 67/00* (2013.01); *B33Y 10/00* (2014.12); *G05B 19/4097* (2013.01); *G05B 19/4099* (2013.01); *B33Y 50/02* (2014.12); *G05B 2219/35134* (2013.01); *G05B 2219/49007* (2013.01); *G05B 2219/49008* (2013.01); *Y10S 901/02* (2013.01); *Y10S 901/30* (2013.01)

(58) Field of Classification Search
CPC ............ G05B 19/4097; G05B 19/4099; G05B 2219/35134; G05B 2219/49007; G05B 2219/49008; B33Y 10/00; B33Y 50/02; B24B 31/112; B25J 9/12; B29C 67/00; Y10S 901/02; Y10S 901/30
See application file for complete search history.

(56) References Cited

U.S. PATENT DOCUMENTS

| 8,387,193 B2 | 3/2013 | Ziegler et al. |
| 8,512,097 B2 | 8/2013 | Lorenzen et al. |

(Continued)

FOREIGN PATENT DOCUMENTS

| WO | WO 2010/145852 | 12/2010 |
| WO | WO 2014/137890 | 9/2014 |
| WO | WO 2014/166594 | 10/2014 |

OTHER PUBLICATIONS

Gibson ("A discussion on the concept of a flexible rapid prototyping cell").*

(Continued)

*Primary Examiner* — Michael D Masinick
*Assistant Examiner* — Hung H Dang
(74) *Attorney, Agent, or Firm* — Fish & Richardson P.C.

(57) ABSTRACT

A three dimensional (3D) definition of a build piece, from which a build plan has been derived, is received. The computer system generates, based on the 3D definition, a processing plan that includes a plurality of robotic instructions to successively orient a build piece created by an additive manufacturing process into successive orientations. The computer system outputs the processing plan for use by a robotic controller.

23 Claims, 8 Drawing Sheets

(51) Int. Cl.
  *G05B 19/4097* (2006.01)
  *B25J 9/12* (2006.01)
  *G05B 19/4099* (2006.01)
  *B24B 31/112* (2006.01)
  *B33Y 10/00* (2015.01)
  *B33Y 50/02* (2015.01)

(56) References Cited

U.S. PATENT DOCUMENTS

| | | | |
|---|---|---|---|
| 2002/0119738 A1* | 8/2002 | Shinbo | B24B 31/102 451/51 |
| 2011/0136410 A1 | 6/2011 | Inatani et al. | |
| 2013/0075957 A1* | 3/2013 | Swanson | B08B 3/104 264/405 |
| 2016/0016277 A1* | 1/2016 | Wolk | B24B 31/003 451/32 |

OTHER PUBLICATIONS

Trebi (https://www.youtube.com/watch?v=yVm6eRWzPPc).*
Gibson, A discussion on the concept of a flexible rapid prototyping cell, 1996, Rapid Prototyping Journal, MCB University Press, vol. 2 • No. 2 • pp. 32-38 (Year: 1996).*
Trebi, https://www.youtube.com/watch?v=yVm6eRWzPPc , 2013 (Year: 2013).*
Gibson, "A discussion on the concept of a flexible rapid prototyping cell," Rapid Prototyping Journal, Jun. 1, 1996, pp. 32-38.
International Preliminary Report on Patentability in International Application No. PCT/US2015/061988, dated Jul. 11, 2017, 11 pages.
International Search Report and Written Opinion in International Application No. PCT/US2015/061988, dated Feb. 24, 2016, 17 pages.
www.kramerindustriesonline.com [online]. "Choosing the Right System" [retrieved on Feb. 27, 2014]. Retrieved from the Internet: URL http://www.kramerindustriesonline.com/finishing-guides/choosing-the-right-systems.htm, 3 pages.

* cited by examiner

METHOD FOR PROCESSING ADDITIVELY MANUFACTURED PART BY ROBOTICALLY MOVING MEDIUM INSIDE PART CAVITY

CROSS-REFERENCE TO RELATED APPLICATION

Pursuant to 35 U.S.C. § 119(e), this application claims priority to U.S. Provisional Application Ser. No. 62/101,611, filed Jan. 9, 2015, the contents of which are hereby incorporated by reference.

TECHNICAL FIELD

This document relates to processing of manufactured parts, as well as articles made by such processes.

BACKGROUND

Additive manufacturing is a process of manufacturing whereby a build piece is created by adding a manufacturing medium (e.g., a metal, plastics) to a part, as opposed to removing media to create the part. Examples of additive manufacturing include, but are not limited to, i) additive metal deposition manufacturing, where a laser or other heat source sinters or melts a metal medium; ii) stereolithography, where a light source cures a photopolymer; and iii) fused deposition modeling, where a thermoplastic is extruded and cools to harden.

Many instances of additive manufacturing call for support structures to be built with the build piece. The support structures may be used, for example, to support overhangs or other geometry in the build piece that are not supported by lower layers of the build piece's geometry.

SUMMARY

In one aspect, a method includes receiving, by a computer system, a three dimensional (3D) definition of a build piece from which a build plan has been derived. The method further includes generating, by the computer system, based on the 3D definition, a processing plan that includes a plurality of robotic instructions to successively orient a build piece created by an additive manufacturing process into successive orientations. The method further includes outputting, by the computer system, the processing plan for use by a robotic controller.

Implementations can include any, all, or none of the following features. The method including inputting, by a robotic controller, the processing plan; and causing, by the robotic controller, a robotic manipulator to execute the processing plan. The processing plan further includes instructions to vibrate the build piece. The 3D definition includes a cavity with a plurality of sections; and wherein each successive orientation corresponds to a section. The 3D definition includes a cavity with a plurality of sections; and wherein each successive orientation allows at least one medium to move in a section. The method including generating robotic instructions to load at least one medium into a cavity of the build piece. Each of the successive orientation defines the same angle between a surface of the build piece and the horizontal. The robotic instructions to successively orient a build piece into successive orientations specify a plurality of durations, each successive orientation having a corresponding duration. Each duration is calculated based on a length of a corresponding section defined by the 3D definition.

In one aspect, a method includes receiving, by a robotic control system, a processing plan that includes a plurality of robotic instructions to successively orient a build piece created by an additive manufacturing process into successive orientations. The processing plan is generated based on a 3D definition of the build piece. The method further includes causing, by the robotic control system, a communicably coupled robot to successively orient the build piece into successive orientations.

Implementations can include any, all, or none of the following features. The processing plan further includes instructions to vibrate the build piece. The 3D definition includes a cavity with a plurality of sections; and wherein each successive orientation corresponds to a section. The 3D definition includes a cavity with a plurality of sections; and wherein each successive orientation allows at least one medium to move in a section. The processing plan further includes a plurality of robotic instructions to load at least one medium into a cavity of the build piece. Each of the successive orientation defines the same angle between a surface of the build piece and the horizontal. The robotic instructions to successively orient a build piece into successive orientations specify a plurality of durations, each successive orientation having a corresponding duration. Each duration is calculated based on a length of a corresponding section defined by the 3D definition.

In one aspect, a method includes orienting, by a robot, a build piece into successive orientations, wherein: the build piece is created by an additive manufacturing process according to a build plan. The build plan is created based on a (3D) definition of the build piece the successive orientations are defined based on the (3D) definition of the build piece.

Implementations can include any, all, or none of the following features. The method including vibrating the build piece. The build piece includes a cavity with a plurality of sections; and wherein each successive orientation corresponds to a section. The build piece includes a cavity with a plurality of sections; and wherein each successive orientation allows at least one medium to move in a section. The method including loading at least one medium into a cavity of the build piece. Each of the successive orientation defines the same angle between a surface of the build piece and the horizontal. To orient, by the robot, the build piece into successive orientations, robot orients the build piece into successive orientations, and for each successive orientation, pauses at each successive orientation for corresponding durations.

In one aspect, a non-transitory computer storage device encoded with computer program instructions that, when executed by one or more processors, cause a computer device to perform operations includes receiving, by a computer system, a three dimensional (3D) definition of a build piece from which a build plan has been derived. The device further includes generating, by the computer system, based on the 3D definition, a processing plan that includes a plurality of robotic instructions to successively orient a build piece created by an additive manufacturing process into successive orientations. The instructions further include outputting, by the computer system, the processing plan for use by a robotic controller.

Implementations can include any, all, or none of the following features. The operations further include inputting, by a robotic controller, the processing plan; and causing, by the robotic controller, a robotic manipulator to execute the processing plan. The processing plan further includes instructions to vibrate the build piece. The 3D definition includes a cavity with a plurality of sections; and wherein each successive orientation corresponds to a section. The 3D definition includes a cavity with a plurality of sections; and wherein each successive orientation allows at least one medium to move in a section. The operations further include generating robotic instructions to load at least one medium into a cavity of the build piece. Each of the successive orientation defines the same angle between a surface of the build piece and the horizontal. The robotic instructions to successively orient a build piece into successive orientations specify a plurality of durations, each successive orientation having a corresponding duration. Each duration is calculated based on a length of a corresponding section defined by the 3D definition.

In one aspect, a method includes loading at least one medium into a cavity of a build piece, the build piece being created by an additive manufacturing process. The method further includes moving the medium in the cavity by orienting the build piece into successive orientations.

Implementations can include any, all, or none of the following features. The cavity has a plurality of sections; and wherein each successive orientation corresponds to a section. The method including vibrating the build piece. The build piece includes a cavity with a plurality of sections; and wherein each successive orientation corresponds to a section. The build piece includes a cavity with a plurality of sections; and wherein each successive orientation allows at least one medium to move in a section. Each of the successive orientation defines the same angle between a surface of the build piece and the horizontal. To the medium in the cavity by orienting the build piece into successive orientations, the build piece is moved into successive orientations paused at each successive orientation or corresponding durations. The medium including an abrasive surface. The cavity has a cavity surface; and moving the medium in the cavity polishes the cavity surface. The build piece has a support structure in the cavity; and wherein moving the magnetic medium in the cavity removes the support structure from the build piece. The additive manufacturing process results in a build material in the cavity; and wherein moving the medium in the cavity removes a build material from the cavity.

In one aspect, an article of manufacture is obtained by the methods described in this document.

Implementations may include one or more of the following advantages. By moving a medium inside of additively-manufactured part (i.e., a build piece), support structures (e.g., structures in a cavity that are not readily accessible) can be removed, the inner surfaces (e.g., surfaces of a cavity) of the part can be polished, and/or the part can be tested (e.g., to ensure the cavity of the part is formed correctly) in a single process. The single process may be highly automated, requiring less operator-time than other processes that accomplish the same or similar results. The motion used to process an additively-manufactured part may be derived from the definition of the part needed for the additive manufacturing of the part. The movement of polishing media may be used to polish internal surfaces of a part that cannot be polished by other methods such as extrusion polishing. For example, these processes may polish internal cavities having acute internal angles. By moving a medium inside of additively-manufactured part, polishing of the build piece is possible without accretion and other undesirable ballistic effects often associated with compressed liquid flow. By moving a medium inside of additively-manufactured part, it is possible to create new structures in the build piece, such as depressions and other textures. These new structures may have finer details than is possible with a conventional additive manufacturing process used to create the build piece.

DESCRIPTION OF DRAWINGS

Like reference symbols in the various drawings indicate like elements

DETAILED DESCRIPTION

A build piece can be created from a build plan by an additive manufacturing process (e.g., a direct metal manufacturing process), such as that described herein. The build piece may include one or more internal cavities accessible by ports to the surface of the build piece. Media can be loaded into the build piece and moved within the cavity. In some implementations, the build piece may be manipulated by a robotic arm and moved such that gravity and vibrations move the media.

Moving at least one medium within a build piece can be used to accomplish a number of goals. In some cases, the media can be used to polish one or more surfaces of an internal cavity of the build piece. In some cases, the media can be used to flush out build material debris that has been left in the internal cavity. In some cases, moving the medium allows the build piece to be tested to ensure that an internal cavity is the correct shape and/or size. Other uses are possible.

Figure 1:
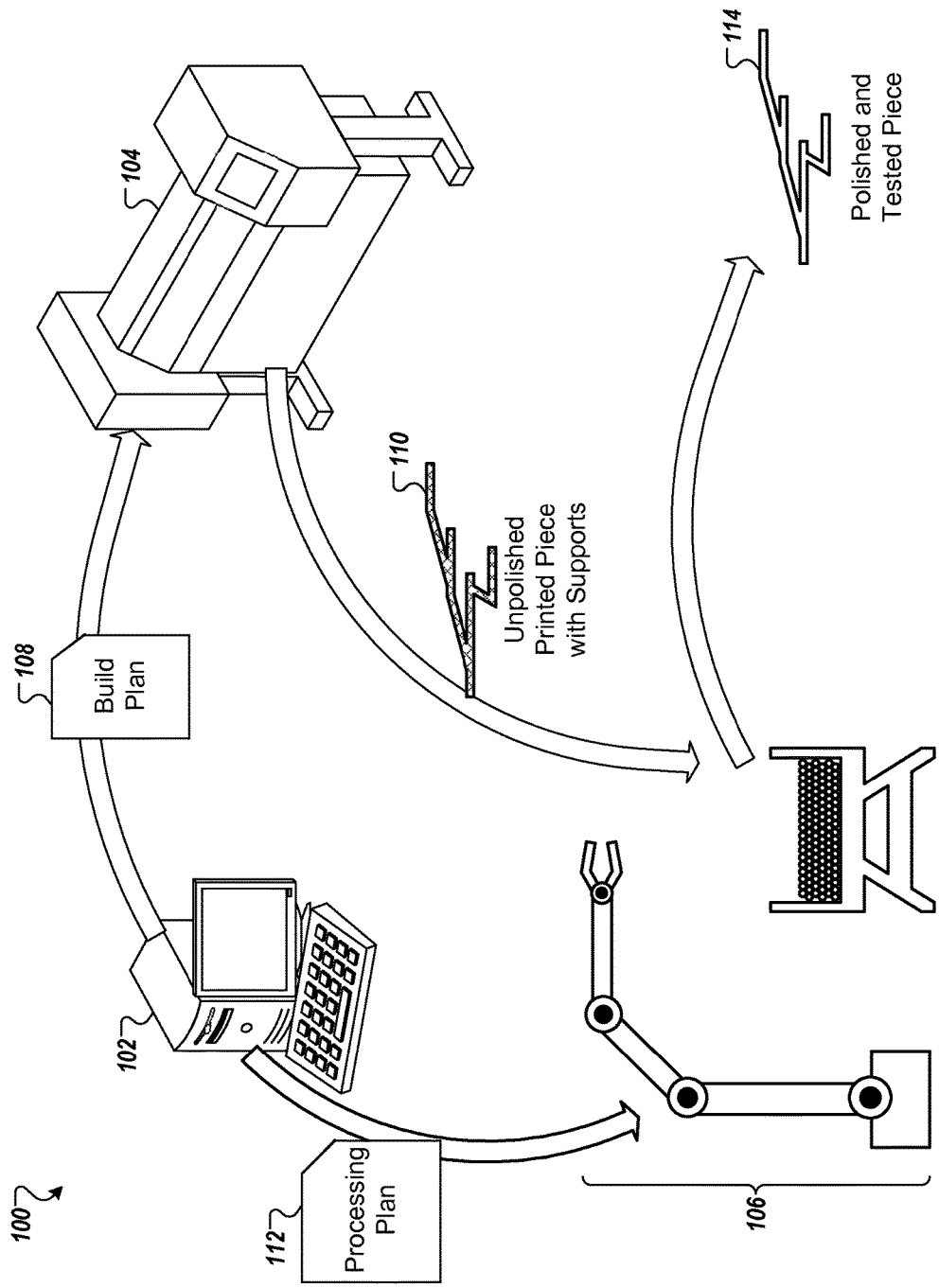
FIG. 1 shows an exemplary system for processing pieces created via an additive manufacturing process.

FIG. 1 shows an exemplary system 100 for processing build pieces created via an additive manufacturing process. The system 100 can include, but is not limited to, a computer system 102, an additive-manufacturing printer 104, and a media station 106. In general, the system 100 may be used to design, print, and process a desired manufactured part.

The computer system 102 can include any type of appropriate computing hardware and software used to design a part (e.g., a build piece or a portion thereof) to be created by an additive metal deposition process. For example, the computer system 102 may include one or more computers loaded with computer aided drafting (CAD) programs. A user may use these programs to load, create, or modify a three dimensional (3D) definition of a desired part. In some implementations, the computer system 102 can include multiple computers or work stations networked together via a computing network. A desktop computer is shown, but different or additional computer types may be included in the computer system 102. These may include, but are not limited to, laptops, mobile computing devices, network servers, and distributed application servers (sometimes known as cloud service providers).

Using the CAD application or another application, the same user or a different user may create a build plan 108 for the desired part. In some implementations, the build plan 108 can be created by modifying the 3D definition of the desired part. For example, the 3D definition of the desired part can be split into layers according to a format used by the additive-manufacturing printer 104. In some implementations, the build plan can be one or more data files that conform to the Standard Tessellation Language (STL), Additive Manufacturing File Format (AMF), Polygon File Format (PLY), or other well-known or custom formats. The build plan 108 can be loaded into the additive-manufacturing printer 104 by a suitable method. For example, the computer system 102 can communicate the build plan 108 to the additive-manufacturing printer 104 via a computer network. As another example, a human user may transport the build plan 108 on a removable computer readable medium such as a compact disk (CD) or removable memory stick.

Once the additive-manufacturing printer 104 has received the build plan 108, the additive-manufacturing printer 104 can create a build piece 110 (e.g., a printed, unpolished piece with supports) from the build plan 108. The additive-manufacturing printer 104 can be configured to manufacture metal pieces from a powdered metal, solid resin pieces from liquid resins, plastic pieces from heated thermoplastics, or other types of pieces from other build materials.

In some cases, the additive-manufacturing printer 104 includes a computer controlled laser that sinters, melts, or solidifies a layer of a build material into a solid piece according to a loaded build plan 108. In some cases, the additive-manufacturing printer 104 includes a computer controlled nozzle that extrudes a liquid build material that solidifies in ambient atmosphere or cures under heat or UV irradiation. This layer-wise process (i.e., an additive manufacturing process) may be repeated until the build piece 110 specified by the build plan 108 is created.

The build piece 110 can be loaded into the media station 106 for processing. The media station 106 can include facilities for an operator or unmanned control system to process the build piece 110 with media. It can include, but is not limited to, one or more robotic arms, a hopper of media, vices, jigs, and conveyers for processing and moving the build piece 110.

The computer system 102 can generate a processing plan 112 that can be loaded into the media station 106. For example, a user of the computer system 102 can load, create, or modify the processing plan 112 based on the 3D definition of the desired part (e.g., the final product). The processing plan 112 can include, for example, instructions for robotic movement of the build piece 110. These instructions may be configured, for example, to polish an internal surface of the build piece 110, to clean out residual build materials in the build piece 110, and/or to test the build piece 110 to control its quality. In some cases, the instructions of the processing plan 112 can be in a proprietary or open language used by one or more robotic controllers of the media station 106. Example of robotic control languages include, but are not limited to, VAL, RC+, and ROBOFORTH.

Media of the media station 106 can be loaded into the build piece 110 by a suitable method. For example, either a human or automated machine can retrieve a measured or unmeasured volume of media from a supply of available media and pour the media into one or more ports of the build piece 110. After the media are loaded, a controller of the media station 106 can move the build piece 110 such that the media are moved within the build piece 110. The controller can include any suitable machine that can control the orientation of, and/or impart vibration to, the build piece 110. For example, the build piece 110 can be loaded into a vice or jig, the vice or jig may rotate and/or vibrate according to computer control. In another example, a robotic arm may clamp on the build piece 110 and rotate and/or vibrate the build piece 110. The robotic arm may have available different manipulators useful for different purposes, including gripping of build pieces of different sizes and shapes. The travel path or other movement of the controller may be defined, for example, by the processing plan 112.

Once the process plan 112 has been completed, the processed build piece 114 can be removed from the media station 106 and prepared for further processing, such as packaging. Depending on the specifications of the processing plan 112, the processed build piece 114 may have been polished, cleaned, and/or tested. A piece that has failed a test may be, for example, documented and scrapped. A piece that has passed the test may be utilized in a larger product, put into use, or subjected to further testing or polishing.

Figure 2:
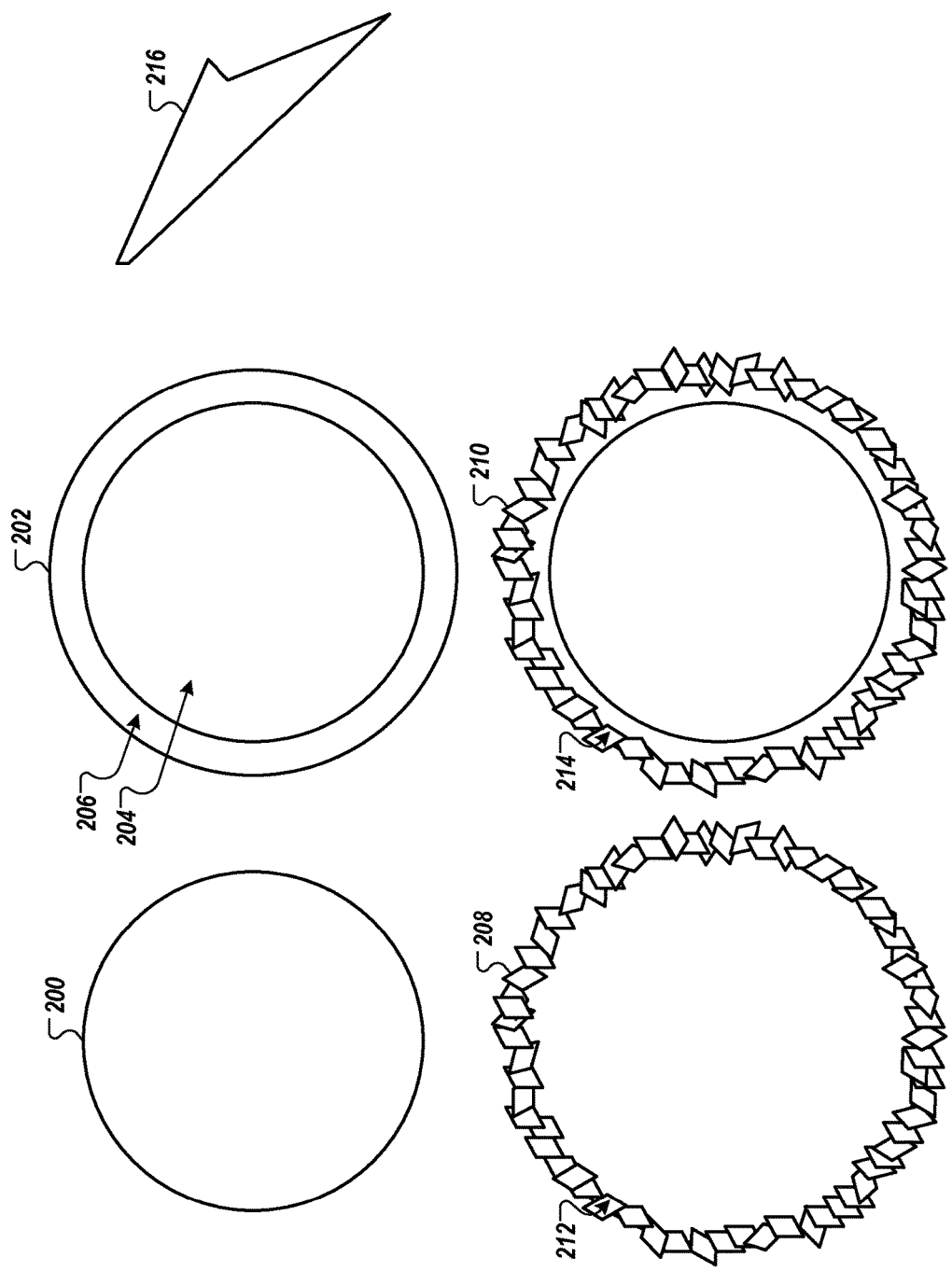
FIG. 2 shows five exemplary media that can be used in processing additive-manufacturing pieces.

FIG. 2 shows exemplary media that can be used in processing an additively-manufactured piece (e.g., the build piece 110 described above). Generally, any appropriate object that can be used in the processes described in this document may be considered suitable media. Most media can be identified as being smaller than the port of a build piece. Five exemplary classes of media are shown here, but it will be appreciated that a large variety of media may be used to process build pieces, including media types not described here. For example, some of the media shown in FIG. 2 are spherical, but other shapes may be used, including media of different regular shapes (e.g., cubes, regular prisms, cones) and irregular shapes (e.g., irregular powders, filings). If a medium is used in a polishing process, it may also be referred to as an abrasive or polishing medium. Generally, but not always, an abrasive medium will be harder than the additively-manufactured piece being polished. In some cases, commercially available products such as ball bearings can be used as a medium. In other cases, custom-ordered or custom-created products can be used as a medium.

In some applications, a single medium is used for processing a piece. For example, a build piece with internal support structures may be processed by a single, relatively large, medium (e.g., a metal ball) used to knock the support structures off the build piece. In another example, a build piece may be polished with a plurality of relatively small media that each has abrasive surfaces.

Medium 200 is an example of a medium in a generally spherical shape. Medium 200 may be made from one or more of the following materials, to name only a few: iron, nickel, aluminum, brass, steel, oxides of these metals, glass, polymers, sand, pumice, walnut shells, corn cob, ceramics, and/or permanent magnets such as ferrite or rare earth magnets. Medium 200 can be selected for processing for a number of reasons.

For example, a single medium 200 can be used to knock support structures out of internal cavities of an additively-manufactured piece. In another example, a plurality of media 200 can be used to polish the internal surfaces of an additively-manufactured piece.

Medium 202 is an example that includes a core 204 and an envelope 206. In some implementations, the core 204 is selected for its density and the envelope 206 is selected for its hardness or other surface properties.

In one example, the envelope 206 of the medium 202 can be made of a soft material while the core 204 is made of a dense, but hard, material. This may be useful, for example, in a process design to clean out residual build materials from the additively-manufactured piece having internal cavities without affecting the finish of the additively-manufactured piece.

Media 208 and 210 correspond to the media 200 and 202, respectively, with the addition of abrasive coatings 212 and 214. The abrasive coatings 212 and 214 can be made of any appropriately abrasive materials that may be adhered to the surface of the media. Generally, but not always, the abrasive coatings 212 and 214 can be used when the media 208 and 210 are used to polish an additively-manufactured piece, and thus may generally be referred to as a polishing medium.

The abrasive coatings 212 and 214 can be made from one or more of the following materials, to name only a few: iron, nickel, aluminum, brass, steel, oxides of these metals, glass, polymers, sand, pumice, walnut shells, corn cob, ceramics, and/or permanent magnets such as ferrite or rare earth magnets. In some cases, the material of the abrasive coatings 212 and 214 may be the same as the core or envelope of the media 208 and/or 210, effectively replacing a smooth surface with a granulated surface of the same material. The selection of material for the abrasive coatings 212 and 214 can be based, at least partly, on the type of material to be polished. For example, to polish a metal additively-manufactured part, a harder metal or diamond coating may be used for the abrasive coatings 212 and 214. For a thermoplastic additively-manufactured part, sand or metal powder may be used for the abrasive coatings 212 and 214.

Medium 216 is an example of an irregular shaped medium. The medium 216 may be made from one or more of the following materials, to name only a few: iron, nickel, aluminum, brass, steel, oxides of these metals, glass, polymers, sand, pumice, walnut shells, corn cob, ceramics, and/or permanent magnets such as ferrite or rare earth magnets. Examples of irregular shaped medium includes, but is not limited to, filings, powders, or grains of consistent (e.g., all granule sized) or varying (e.g., a mix of granule to coarse sand) size. For example, many polishing application may use particles with Krumbien Phi +/−2 or +/−1. To remove support structures, sizes less than the diameter of the port and build-piece may be used. Size differentials sufficient to avoid sticking in partially-removed support structures may be used. In some cases, ballistic fracture of the support structure can leave sprues, burrs, or other remnants that may capture some media.

Figure 3A:
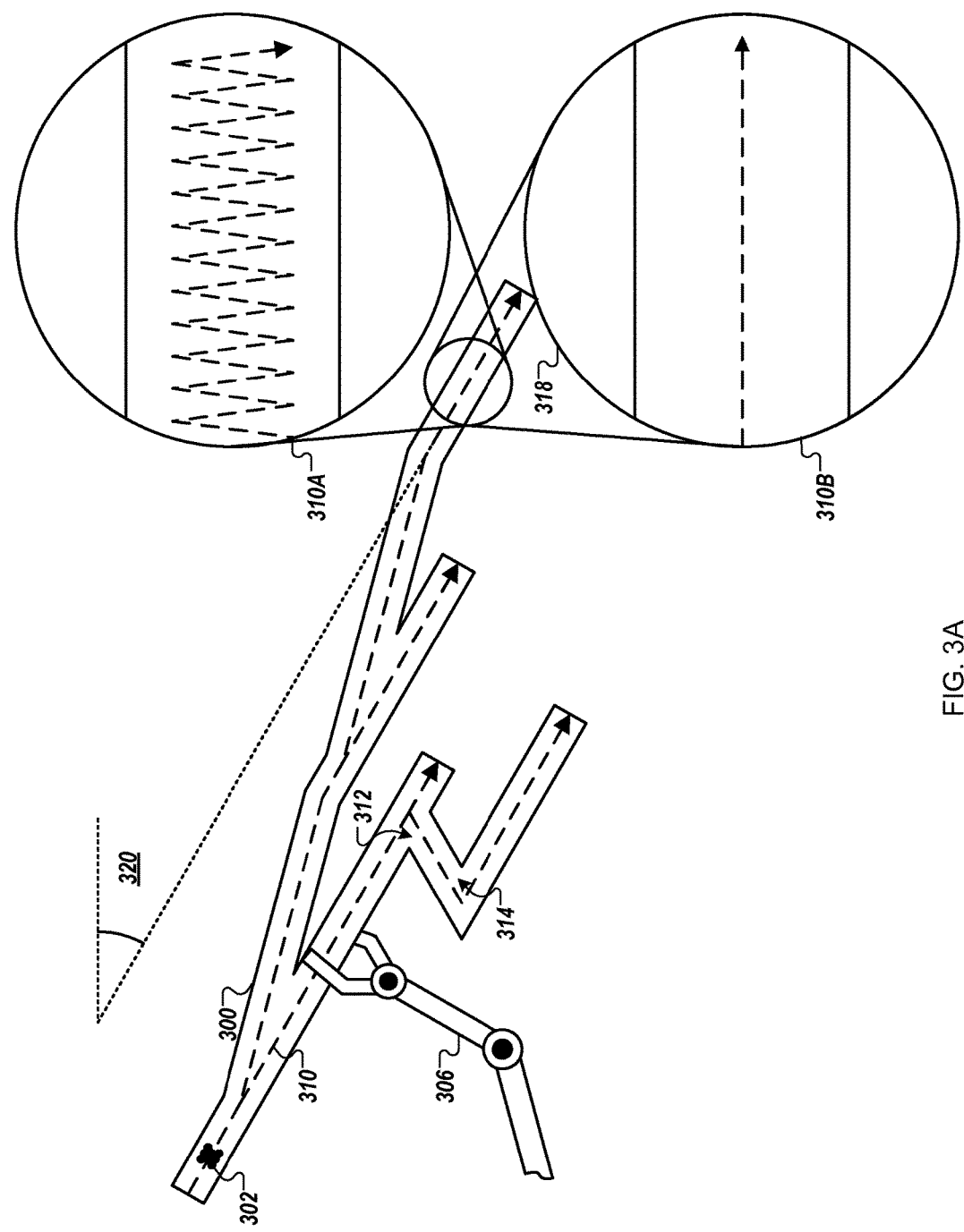
FIGS. 3A, 3B, and 3C show an exemplary build piece being processed.
Figure 3B:
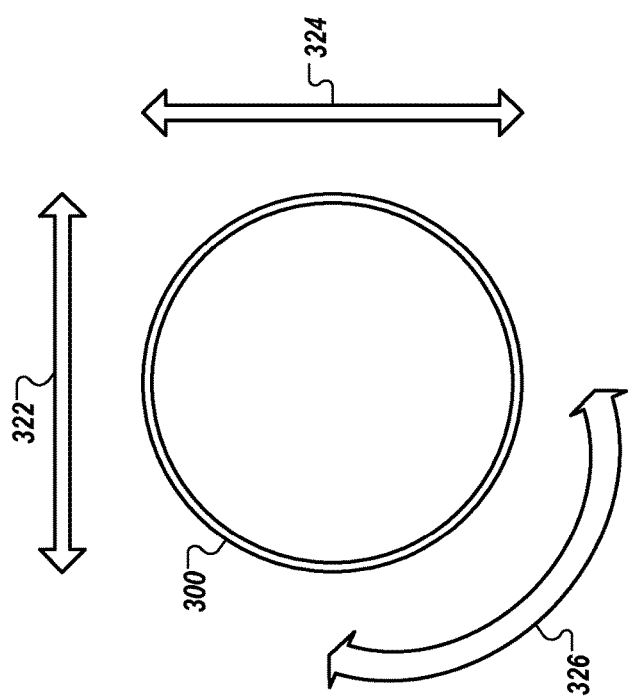
Figure 3C:
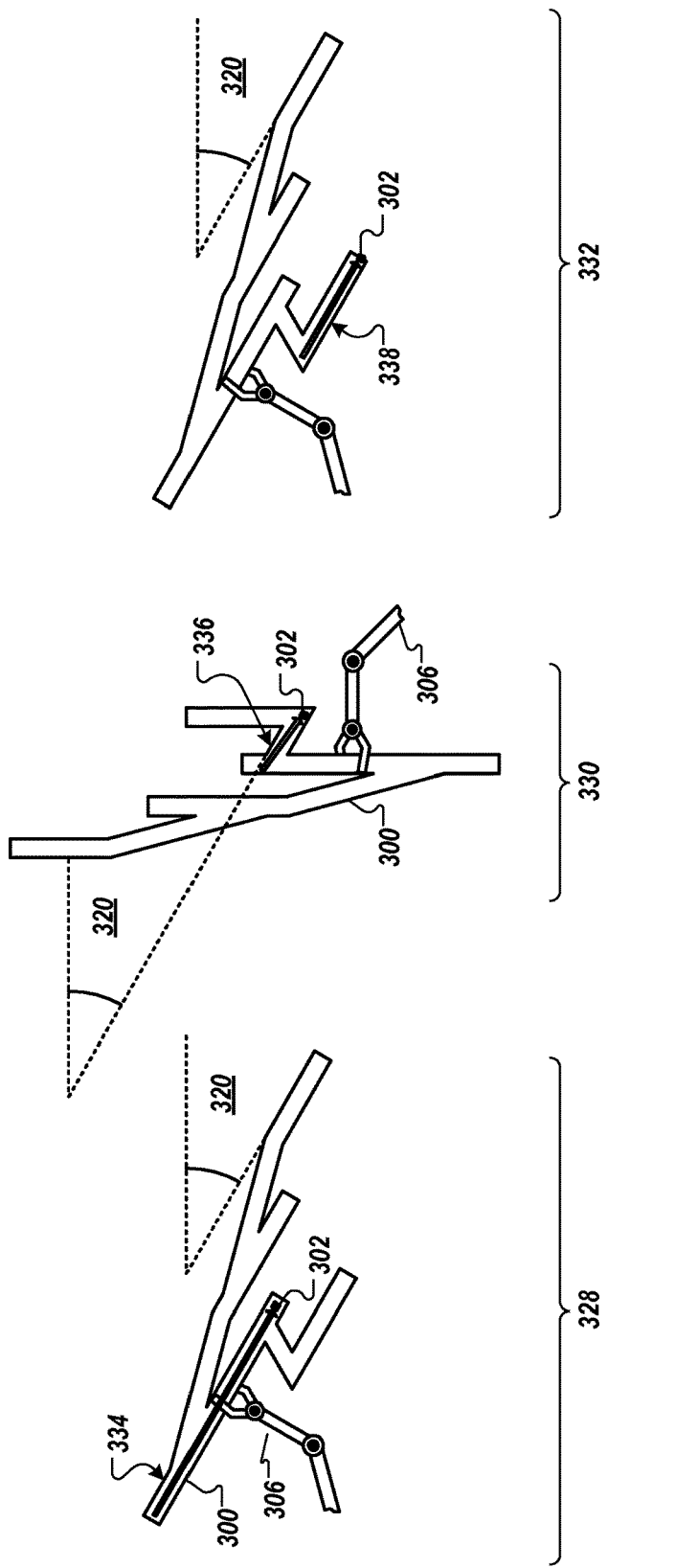

In addition to being selected by shape and size, the media used for a particular application may be selected based on other parameters as well. In some cases, media may be selected based on a combination of particle density, hardness, durability, and abrasive surface. For example, for a build piece with a particular hardness (e.g., a Ti-6Al-4V alloy build piece with a Rockwell hardness of HRC 36), a media with a greater hardness (e.g., tool steel media with a Rockwell hardness of HRC 55) may be used. Similarly, the media should have enough particle density to cause a desired polishing effect when acted upon by gravity FIGS. 3A, 3B, and 3C show an exemplary build piece 300 being processed. FIGS. 3A and 3C show the build piece 300 from a side view and FIG. 3B shows the same build piece 300 from a front view. The build piece 300 can be, for example, an instrument housing created by an additive-manufacturing process, such as a direct metal deposition process in which metal powder is sintered or melted by a laser in a layer-by-layer process to form a solid piece. The instrument housing can include an internal cavity into which sensitive thermocouple sensors can be loaded. However, during manufacture, the cavity has been constructed with internal support structures and the finish of the surface of the cavity is rough enough to damage the thermocouples (see FIG. 4). In such implementations, the build piece 300 can undergo processing to 1) remove the internal support structures, 2) remove any remaining build material in the internal cavity, and 3) polish the surface of the internal cavity.

As shown in FIG. 3A, a plurality of media 302 can be first loaded into the build piece 300. The media 302 is used to polish the build piece 300, and may thus be referred to as polishing media. Although a variety of media types can be used (see FIG. 2), the media 302 are iron filings.

A robotic manipulator 306 can vibrate the build piece 300 and orient the build piece 300 so that the vibration and gravity draw the media 302 through the internal cavities in the build piece 300. In this example, the robotic manipulator 306 is shown as a multi-axis robotic arm with a claw-shaped end-effector. However, other types of robotic manipulators may be used. For example, a robotic manipulator may be a jig with yaw, pitch, roll, and vibration control.

The robotic manipulator 306 can move the build piece 300 so that the media 302 move through the build piece 300 along one or more paths 310. These movements can be created based on the build plan 108 according to the shape of the build piece 300. For example, the computer system 102 can generate the movements from the 3D definition of a part and record the paths as robotic motion instructions in the processing plan 112. As shown in FIG. 3A, the paths 310 may all originate at one port in the build piece 300 and terminate at different ports in the build piece 300. In such a case, it may be necessary to reload the media 302 after the media 302 traverse each branch of the path 310.

To utilize gravity to move the media 302 through the build piece 300, the robotic manipulator 306 may rotate the build piece 300 so that each straight section of the build piece 300 spends time at an angle 320 below the horizontal. The angle 320 and this time period may be set based on parameters of the build piece 300, and other information.

For example, it may be determined from the size, shape, and material of the support structures of the build piece 300 that a particular amount of force is needed to remove the support structures. To achieve this force, the formula Force=Mass*Acceleration may be used, where Force is the desired force, Mass is the mass of the media 302 (or one medium of the media 302), and Acceleration is the acceleration due to gravity reduced by the angle 320 (e.g., 9.87 m/s$^2$*[angle 320/90°], when angle 320 is between 0° and 90°). In another example where vibration is used, the force needed may be the summation of the force of each oscillation plus the force due to gravity.

The time period that the robotic manipulator 306 holds the build piece 300 may be related to the length of each associated straight section of the path 310. That is, for longer straight sections of the path 310, the build piece 300 will be held at the associated angle longer. Adjusting the time period this way can allow the media 302 more time to travel longer sections of the build piece 300 and less time to travels shorter sections of the build piece 300.

FIG. 3B shows a front view a cross-section of the build piece 300, along with three possible directions in which the build piece may be vibrated. For example, the robotic manipulator 306 may vibrate the build piece 300 in a horizontal direction 322, a vertical direction 324, and/or rotationally 326, although other types of vibration are possible. In some cases, the build piece 300 may be vibrated in a combination of directions. For example, the robotic manipulator 306 may vibrate the build piece 300 horizontally 322 and vertically 324, effectively vibrating the build piece 300 diagonally from the front view.

The type of vibration may be selected based on the shape of the build piece 300. For example, when the build piece 300 has a cavity that is generally circular in cross-sectional shape, a rotational vibration 326 may be selected. For build pieces with generally straight-walled cavities (e.g., having a square or rectangular shape in cross-sections), vibration perpendicular or parallel to the straight walls may be used.

The robotic manipulator 306 may impart the vibration to the build piece 300 in a number of ways. For example, the robotic manipulator 306 may quickly engage and disengage the motors used to control the angles of each linkage of the robotic arm to vibrate the build piece 300. In another example, the robotic manipulator 306 may have a dedicated vibration sub-system. Such a subsystem can include a rotating cam or weighted disk, a linear actuator moving a weight in simple harmonic motion, or other technologically appropriate configurations.

FIG. 3C shows a side view of the build piece 300 in various orientations 328, 330, and 332. For example, the robotic manipulator 306 may orient the build piece 300 into the orientation 328, then orientation 330, then orientation 332 as a part of a finishing process for the build piece 300.

As described above, the robotic manipulator 306 can orient the build piece 300 to move the media 302 through the build piece 300. In the example shown in FIG. 3C, the media 302 are being moved along section 334, section 336, and then section 338. First, the robotic manipulator 306 orients the build piece to orientation 328 so that the section 334 is at angle 320 below the horizontal and holds the build piece 300 at the orientation 328 for a duration calculated based on the length of section 334. Next, the robotic manipulator 306 orients the build piece 300 to orientation 330 so that the section 336 is at angle 320 below the horizontal and holds the build piece 300 at the orientation 330 for a duration calculated based on the length of section 336. Next, the robotic manipulator 306 orients the build piece 300 to orientation 332 so that the section 338 is at angle 320 below the horizontal and holds the build piece 300 at the orientation 332 for a duration calculated based on the length of section 338.

Returning to FIG. 3A, the cavity of the build piece 300 includes two acute angles 312 and 314. Unlike some other forms of processing method (e.g., extrusion polishing), the processing method described herein can process a cavity with acute angles without a degradation in results.

As previously described, the robotic manipulator 306 may be configured to vibrate or not vibrate the build piece 300. Detail window 310A shows the path 310 when vibration is used, and detail window 310B shows the path 310 when vibration is not used. Vibration may be used, for example, in a case when the media 302 are much smaller than the cavity of the build piece 300. Vibration may be unneeded, for example, in a case when a medium 302 is nearly the same diameter as the cavity of the build piece 300. In some cases, vibration may be used for only a section of a build piece. For example, a build piece may have a large cavity and a smaller cavity, and vibration may be needed only for the large cavity.

Different processes may be used to accomplish different results. For example, one process may be used to remove support structures of the build piece 300 and another series of polishing processes may be used to polish the surfaces of the internal cavity of the build piece 300. To remove the support structures, relatively large, smooth surfaced media may be used. Once the support structures are removed, a series of successive polishing processes may be applied to the build piece 300. Each successive polishing process may use relatively smaller media with successively finer abrasive surfaces. This may be desirable, for example, if the build piece 300 is to be used as a pipe or another component in a closed system in which fluid flows. As is known, as the dimensions of a pipe become small relative to forces of the fluid such as surface tension, the finish of the surfaces of the closed system are of greater concern.

In another example, to test that the build part 300 is built according to its build plan, a different process may be used than those used to polish the build part 300. In a testing process, a single medium 302 can be used instead of a group of media 302. If, for example, the build piece is designed to house a thermocouple a certain diameter, a single medium 302 can be a ball bearing marginally larger than the diameter of the thermocouple and made from a material that is as soft or softer than the thermocouple.

The robotic manipulator 306 can move the medium 302 through the internal cavity of the build piece 300 along the paths 310 as part of the testing of the build piece 300. For example, if the medium 302 moves each of the ports at the end of the paths 310, the build piece 300 may be approved as being built according to its build plan. This may indicate, for example, that there are no obstructions within the internal cavity that would prevent the thermocouple from traveling through the internal cavity. As a part of another test, the medium 302 may be made of, or enveloped in (see medium 202 of FIG. 2) the same material as the thermocouple is made of. In such implementations, if the medium 302 emerges and is without scratches, this may indicate that a thermocouple can pass through the internal cavity without receiving scratches and thus the build piece 300 may be verified as passing the test. If, on the other hand, the medium 302 fails to emerge from a port, or if the medium 302 emerges with scratches, the build piece 300 may be considered as failing the test. In the case of a failed build piece 300, the build piece may be inspected, disposed of, repaired, or have other appropriate action taken.

In some implementations, the observation of the medium 302 during or after a test may be performed by a human operator, an automated sensor, or both.

Figure 4:
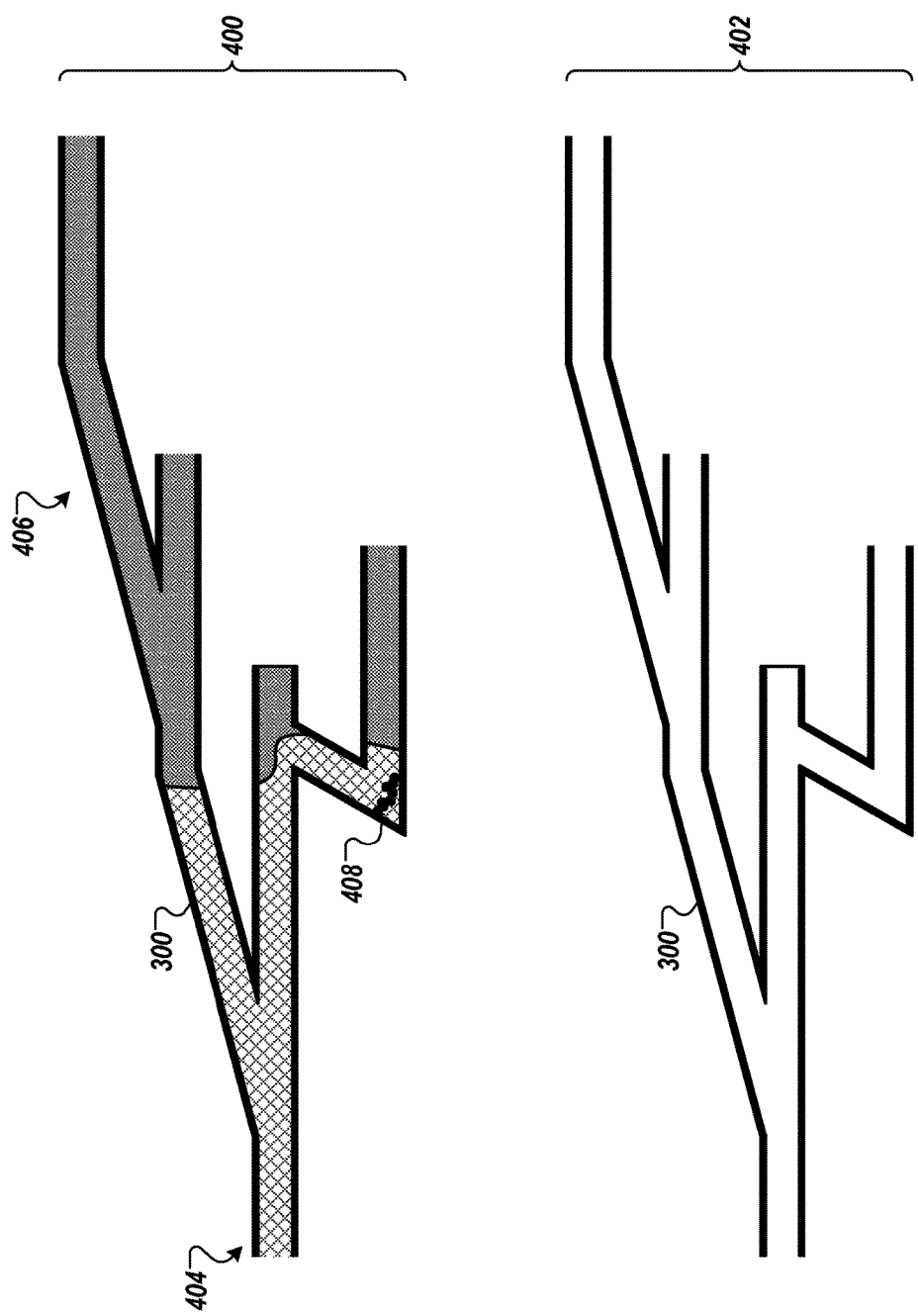
FIG. 4 shows the build piece in FIG. 3 before and after being processed.

FIG. 4 shows the build piece 300 before and after being processed. For illustrative purposes, the build piece 300 is shown in two cross-sectional views 400 and 402.

The view 400 shows a cross-sectional view of the build piece 300 after it has been printed, but before it has been processed by as illustrated in FIG. 3. Section 404 shows that, in the internal cavity of the build piece 400, a support structure is created as part of the additive-manufacturing process that creates the build piece 300. Such a support structure is needed, for example, when some layers in an additive-manufacturing process are not fully supported by previous layers in the process. The support structures can provide the needed support, but often need to be removed after manufacture.

Section 406 of view 400 illustratively removes the support structure shown in section 404. In section 406, the surface of the internal cavity of the build piece 300 is shown. Due to, among other factors, the layer-wise process of additive manufacturing, build pieces can have a constrained range of surface finishes when made. For some uses, this range of surface finishes is unacceptably rough and must be polished if the build piece is to be used for some applications. As shown in FIG. 4, the internal cavity of the build piece 300 must be smoothed, for example, to allow the insertion of a sensitive thermocouple sensor that would be ruined if scratched.

Additionally, additive-manufacturing build processes can leave build material debris 408 in the cavity of the build piece 300. Depending on the configuration of the additive-manufacturing, the excess build material may be a powder (e.g., in direct metal manufacturing), a liquid (e.g., in stereolithography), and/or a solid (e.g., in fused deposition). In some cases, the build material debris 408 can be removed by, for example, blowing compressed air or another fluid through the internal cavity. However, depending on the configuration, this may fail to remove some or all of the build material debris 408. For example, if the build material debris 408 is a liquid that is not water soluble and has strong adhesion to the build material 300, a water flush may fail to remove the build material debris 408. If the build material debris 480 is fused to the build piece 300 (e.g., as may be the case in fused deposition) or if the build material debris 408 is in an acute angle of the internal cavity (e.g., as shown in view 400), a flush may fail to remove some or all of the build material debris 408.

View 402 shows the build piece 300 after processing. As shown in view 402, the support structure has been removed, the surface of the internal cavity has been smoothed, and the build material debris 408 has been removed. Additionally, the build piece 300 has been tested and found to conform to the requirements of its build plan.

In some cases, the support removal, polishing, build material debris removal, and testing can be performed in the course of a single process. That is, the media 302 can traverse the paths 310 a single time to produce this result. However, multiple processes, identical or different, can be performed to produce this result. For example, a first process can be performed to remove the support structures from the internal cavity. A second process can be performed to remove any residual build material debris 408. A third process can be performed to polish the internal cavity of the build piece 300. A fourth process can be performed to test whether the build piece 300 is built according to its build plan. Optionally, additional processes can be performed to accomplish other results, or as part of these results. For example, the polishing process can be repeated with successively finer grit polishing media 302. The processes for each result can differ according to their purpose. For example, the testing process may require the build piece 300 to be rotated, while the polishing processes may require the build piece 300 to be rotated and vibrated.

Figure 5:
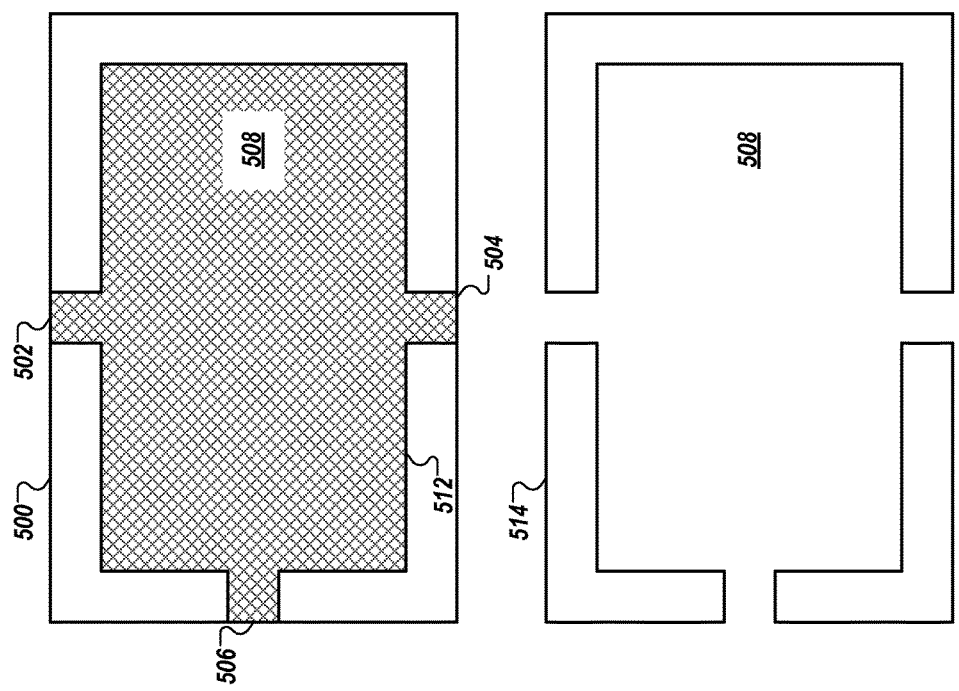
FIG. 5 shows another exemplary build piece before and after being processed.

FIG. 5 shows cross-sectional views of another exemplary build piece before and after being processed. The build piece may have been created, for example, by the additive-manufacturing printer 104 of the system 100, or any other suitable machine, from a build plan that includes support structures.

As shown in FIG. 5, the build piece 500 may include ports 502, 504, and 506 and an internal cavity 508. The internal cavity 508 is connected to the ports 502, 504,506 such that a medium can be loaded into the internal cavity 508.

To support the build piece 500 as it is being manufactured, the internal cavity 508 includes a support structure 512. This support structure may be necessary, for example, to support the overhangs created by manufacturing the build piece 500 in an additive manufacturing process (e.g., a layer-wise process). During such a manufacturing process, it is possible that powdered metal or other appropriate build materials may become trapped in the cavity 508.

Build piece 514 shows the build piece 500 after it has been processed. In this example, the build piece 500 has only been processed to remove the support structure 512. The internal cavity 508 has not been polished, and residual build material has not been substantially removed, and the build piece 500 has not been tested. In other examples, it is possible that any combination of support structure removal, cleaning, polishing, and testing may be applied to a build piece, as desired. In other examples, the process described herein can include only a single one of support structure removal, cleaning, polishing, and testing, or any combination.

In some implementations, cleaning, polishing, and/or testing may never be applied to the build piece 514. Alternatively, some or all of the cleaning, polishing, and/or testing may be applied using processes other than those described in this document. Additionally, other processes may be applied to the build piece 500 before the processes described in this document, or applied to the build piece 514 after the processes. In one example, the build piece 514 may receive, for example, a chemical etch, painting, or electroplating. In another example, the build piece 500 may receive, before the processes described in this document, other processes such as a chemical etch, painting, or electroplating.

Figure 6:
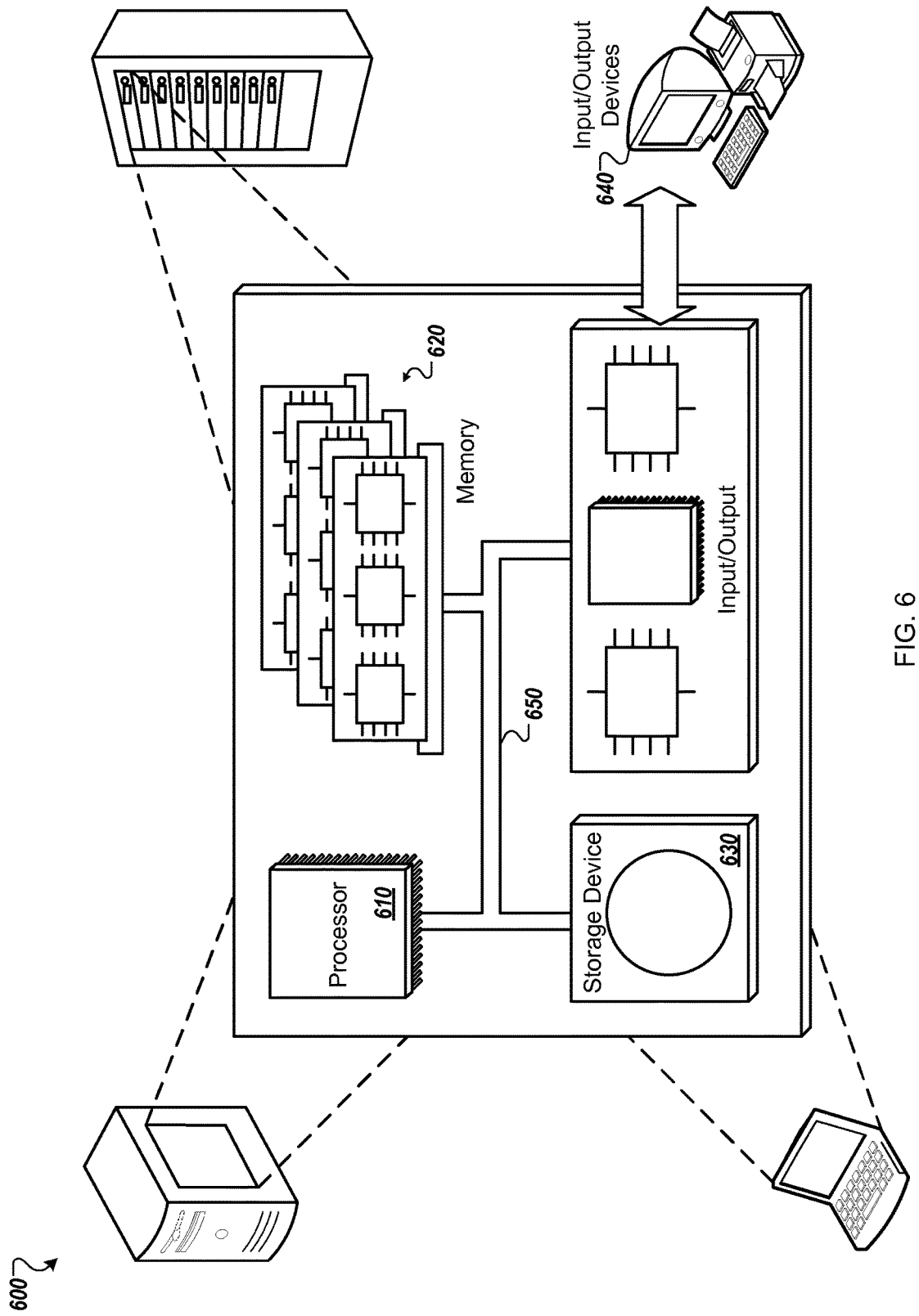
FIG. 6 is a schematic diagram that shows an example of a computing system.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include disks, such as internal hard disks and removable disks; to-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; disks such as internal hard disks and removable disks; to-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A method, comprising:
A method, comprising:
    receiving, by a computer system, a three dimensional (3D) definition of a build piece from which a build plan has been derived, the 3D definition comprising a plurality of connected internal cavity sections;
    generating, by the computer system, based on the 3D definition, a processing plan that comprises a plurality of robotic instructions to successively robotically move the build piece created by an additive manufacturing process into successive orientations in space, such that:
        for each particular connected internal cavity section:
            there is one of the successive orientations in the processing plan that corresponds to the particular connected internal cavity section;
            the robotic instructions for robotic movement for the corresponding particular internal cavity section are created to ensure that the build piece is moved so that one surface of the corresponding particular connected internal cavity section and a horizontal plane in the space define an angle of constant value, wherein the angle is great enough to cause at least one medium inside the particular connected internal cavity section to have a polishing effect due to the force of gravity moving the medium along the length of the corresponding particular connected internal cavity section, wherein the constant value is the same value for all connected internal cavity sections; and
        wherein the robotic instructions to successively orient a build piece into successive orientations specify a plurality of durations, each successive orientation having a corresponding duration at which the build piece is to be held at the successive orientation for a length of the corresponding duration;
    outputting, by the computer system, the processing plan for use by a robotic controller;
    inputting, by a robotic controller, the processing plan; and
    causing, by the robotic controller, a robotic manipulator to execute the processing plan.

2. The method of claim 1, wherein the processing plan further comprises instructions to vibrate the build piece.

3. The method of claim 1, wherein the 3D definition comprises a cavity with a plurality of sections; and
    wherein each successive orientation corresponds to a section.

4. The method of claim 1, wherein the 3D definition comprises a cavity with a plurality of sections; and
    wherein each successive orientation allows at least one medium to move in a section.

5. The method of claim 1, further comprising generating robotic instructions to load at least one medium into a cavity of the build piece.

6. The method of claim 1, wherein each duration is calculated based on a length of a corresponding section defined by the 3D definition.

7. A method, comprising:
    receiving, by a robotic control system, a processing plan that comprises a plurality of robotic instructions to successively robotically move the build piece created by an additive manufacturing process into successive orientations in space, wherein the processing plan is generated based on a 3D definition of the build piece, the 3D definition comprising a plurality of connected internal cavity sections, wherein:
        for each particular connected internal cavity section:
            there is one of the successive orientations in the processing plan that corresponds to the particular connected internal cavity section;
            the robotic instructions for robotic movement for the corresponding particular internal cavity section are created to ensure that the build piece is moved so that one surface of the corresponding particular connected internal cavity section and a horizontal plane in the space define an angle of constant value, wherein the angle is great enough to cause at least one medium inside the particular connected internal cavity section to have a polishing effect due to the force of gravity moving the medium along the length of the corresponding particular connected internal cavity section, wherein the constant value is the same value for all connected internal cavity sections; and wherein the robotic instructions to successively orient a build piece into successive orientations specify a plurality of durations, each successive orientation having a corresponding duration at which the build piece is to be held at the successive orientation for a length of the corresponding duration;

causing, by the robotic control system, a communicably coupled robot to successively orient the build piece into successive orientations.

8. The method of claim 7, wherein the processing plan further comprises instructions to vibrate the build piece.

9. The method of claim 7, wherein the 3D definition comprises a cavity with a plurality of sections; and wherein each successive orientation corresponds to a section.

10. The method of claim 7, wherein the 3D definition comprises a cavity with a plurality of sections; and wherein each successive orientation allows at least one medium to move in a section.

11. The method of claim 7, wherein the processing plan further comprises a plurality of robotic instructions to load at least one medium into a cavity of the build piece.

12. The method of claim 7, wherein each duration is calculated based on a length of a corresponding section defined by the 3D definition.

13. A method, comprising:

robotically move, by a robot, a build piece into successive orientations in space, wherein:

the build piece is created by an additive manufacturing process according to a build plan;

the build plan is created based on a (3D) definition of the build piece, the 3D definition comprising a plurality of connected internal cavity sections, wherein:

for each particular connected internal cavity section:

there is one of the successive orientations in the processing plan that corresponds to the particular connected internal cavity section;

the robotic instructions for robotic movement for the corresponding particular internal cavity section are created to ensure that the build piece is moved so that one surface of the corresponding particular connected internal cavity section and a horizontal plane in the space define an angle of constant value, wherein the angle is great enough to cause at least one medium inside the particular connected internal cavity section to have a polishing effect due to the force of gravity moving the medium along the length of the corresponding particular connected internal cavity section, wherein the constant value is the same value for all connected internal cavity sections;

the successive orientations are defined based on the (3D) definition of the build piece, each successive orientation having a corresponding duration at which the build piece is to be held at the successive orientation for a length of the corresponding duration.

14. The method of claim 13, further comprising vibrating the build piece.

15. The method of claim 13, wherein the build piece comprises a cavity with a plurality of sections; and wherein each successive orientation corresponds to a section.

16. The method of claim 13, wherein the build piece comprises a cavity with a plurality of sections; and wherein each successive orientation allows at least one medium to move in a section.

17. The method of claim 13, further comprising loading at least one medium into a cavity of the build piece.

18. A non-transitory computer storage device encoded with computer program instructions that, when executed by one or more processors, cause a computer device to perform operations, comprising:

receiving, by a computer system, a three dimensional (3D) definition of a build piece from which a build plan has been derived, the 3D definition comprising a plurality of connected internal cavity sections;

generating, by the computer system, based on the 3D definition, a processing plan that comprises a plurality of robotic instructions to successively robotically move the build piece created by an additive manufacturing process into successive orientations in space, such that:

for each particular connected internal cavity section:

there is one of the successive orientations in the processing plan that corresponds to the particular connected internal cavity section;

the robotic instructions for robotic movement for the corresponding particular internal cavity section are created to ensure that the build piece is moved so that one surface of the corresponding particular connected internal cavity section and a horizontal plane in the space define an angle of constant value, wherein the angle is great enough to cause at least one medium inside the particular connected internal cavity section to have a polishing effect due to the force of gravity moving the medium along the length of the corresponding particular connected internal cavity section, wherein the constant value is the same value for all connected internal cavity sections; and wherein the robotic instructions to successively orient a build piece into successive orientations specify a plurality of durations, each successive orientation having a corresponding duration at which the build piece is to be held at the successive orientation for a length of the corresponding duration;

outputting, by the computer system, the processing plan for use by a robotic controller;

inputting, by a robotic controller, the processing plan; and causing, by the robotic controller, a robotic manipulator to execute the processing plan.

19. The computer storage device of claim 18, wherein the processing plan further comprises instructions to vibrate the build piece.

20. The computer storage device of claim 18, wherein the 3D definition comprises a cavity with a plurality of sections; and wherein each successive orientation corresponds to a section.

21. The computer storage device of claim 18, wherein the 3D definition comprises a cavity with a plurality of sections; and wherein each successive orientation allows at least one medium to move in a section.

22. The computer storage device of claim 18, wherein the operations further comprise generating robotic instructions to load at least one medium into a cavity of the build piece.

23. The computer storage device of claim 18, wherein each duration is calculated based on a length of a corresponding section defined by the 3D definition.

* * * * *

UNITED STATES PATENT AND TRADEMARK OFFICE
CERTIFICATE OF CORRECTION

PATENT NO.        : 10,189,211 B2
APPLICATION NO.   : 14/947751
DATED             : January 29, 2019
INVENTOR(S)       : Scott Volk and Michael D. Pinnisi Page 1 of 1

It is certified that error appears in the above-identified patent and that said Letters Patent is hereby corrected as shown below:

In the Claims

<u>Claim 1</u>
Column 13, Line 58: Delete "A method, comprising:"

Signed and Sealed this
Second Day of April, 2019

Andrei Iancu
*Director of the United States Patent and Trademark Office*